United States Patent [19]
Vaghani et al.

[11] Patent Number: 5,424,593
[45] Date of Patent: Jun. 13, 1995

[54] GENERATOR ROTOR COOLING

[75] Inventors: Vallabh V. Vaghani, Belvidere; Wayne A. Flygare, Rockford, both of Ill.

[73] Assignee: Sundstrand Corporation, Rockford, Ill.

[21] Appl. No.: 755,255

[22] Filed: Jul. 15, 1985

[51] Int. Cl.⁶ ............................................. H02K 9/00
[52] U.S. Cl. ........................................ 310/64; 310/61; 310/68 D; 310/114; 310/165
[58] Field of Search .................. 310/61, 90, 68 R, 52, 310/68 D, 53, 114, 60 R, 165, 54, 58, 59, 64, 65

[56] References Cited

U.S. PATENT DOCUMENTS

| | | | |
|---|---|---|---|
| 3,007,064 | 10/1961 | Ward | 310/54 |
| 3,007,065 | 10/1961 | Rigney | 310/54 |
| 3,043,968 | 7/1962 | Ward | 310/54 |
| 3,261,295 | 7/1966 | White | 310/54 |
| 3,509,447 | 4/1970 | Wharton | 310/68 R |
| 3,588,290 | 6/1971 | Kreutzkampf | 310/61 |
| 3,629,627 | 12/1971 | Dafler | 310/54 |
| 3,629,628 | 12/1971 | Rank | 310/61 |
| 3,648,085 | 3/1972 | Fujii | 310/54 |
| 3,733,503 | 5/1973 | Potter | 310/68 D |
| 4,139,789 | 2/1979 | Hunt | 310/61 |
| 4,394,593 | 7/1983 | Gocho | 310/54 |
| 4,471,249 | 9/1984 | Okamoto | 310/61 |

FOREIGN PATENT DOCUMENTS

| | | | |
|---|---|---|---|
| 2211811 | 9/1973 | Germany | 310/68 D |
| 2722200 | 11/1978 | Germany | 310/68 D |
| 0419317 | 2/1967 | Switzerland | 310/68 D |

Primary Examiner—R. Skudy
Attorney, Agent, or Firm—Wood, Dalton, Phillips, Mason & Rowe

[57] ABSTRACT

Difficulties in cooling the rotor (28) of a dynamoelectric machine carrying a rotating rectifier (54) are avoided by providing a coolant inlet 68 extending to the interior of a rectifier housing 50 through which the coolant may flow to emerge from a port 66 in the housing 50 and flow via an annulus 52 within the rotor shaft 30 to conduits 98 to cool the rotor windings 48. The coolant is returned to the interior of the rotor shaft 30 and ultimately to a coolant outlet 84.

9 Claims, 3 Drawing Sheets

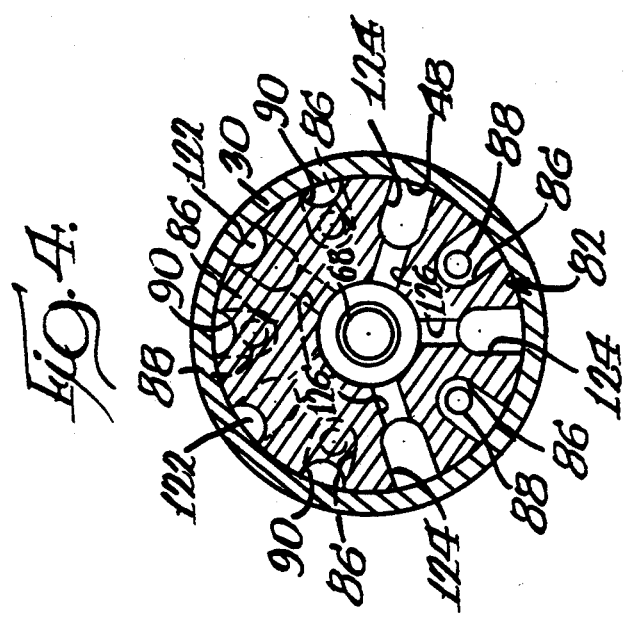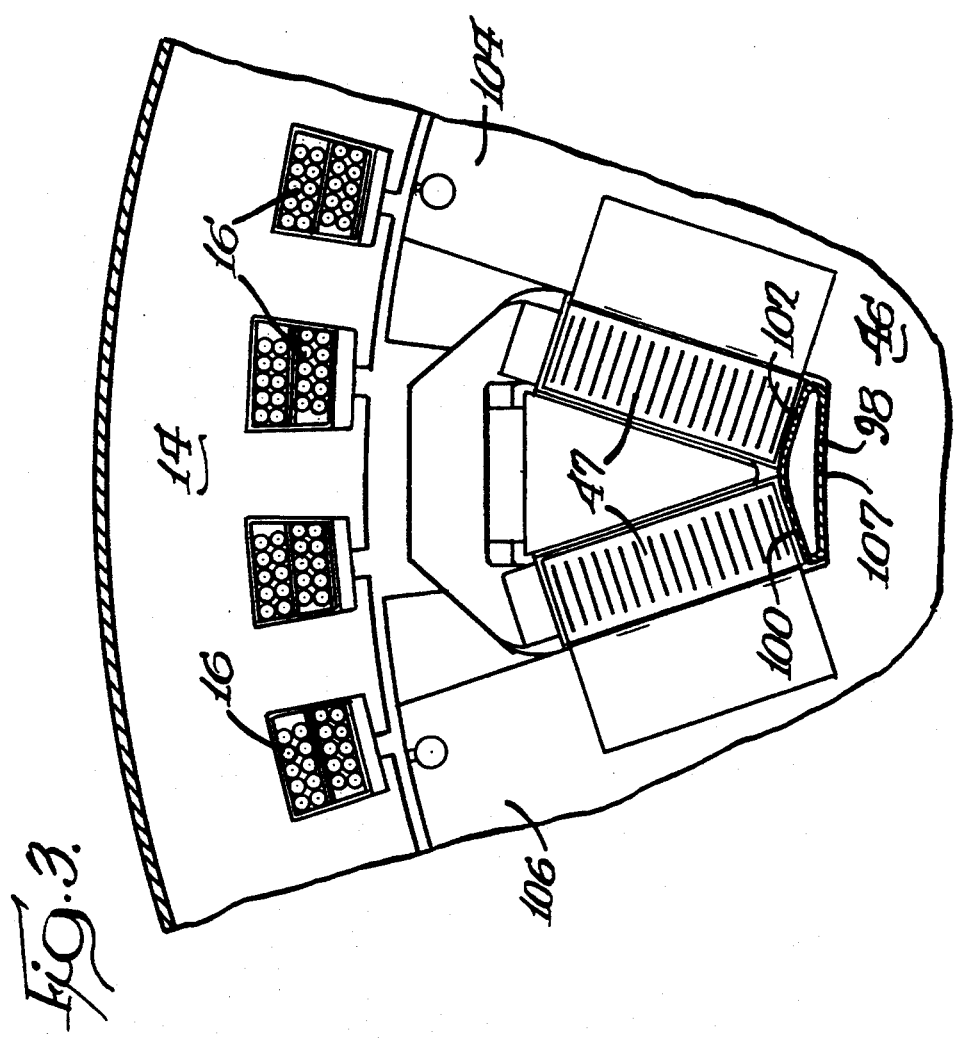

GENERATOR ROTOR COOLING

FIELD OF THE INVENTION

This invention relates to generators, and more specifically, to the cooling of rotors in generators.

BACKGROUND OF THE INVENTION

Prior art of possible relevance includes the following U.S. Pat. Nos.: 3,007,065 issued Oct. 31, 1961 to Rigney; 3,043,968 issued Jul. 10, 1962 to Ward; 3,261,295 issued Jul. 19, 1966 to White; 3,588,290 issued Jun. 28, 1971 to Kreutzkampf; 3,629,628 issued Dec. 21, 1971 to Rank; 3,648,085 issued Mar. 26, 1970 to Fuji; 4,139,789 issued Feb. 13, 1979 to Hunt; and 4,394,593 issued Jul. 19, 1983 to Gocho.

The cooling of various parts of dynamoelectric machines has long been recognized as being advantageous. By cooling various components, the capacity of a given machine is increased because the heat generated during operation which might otherwise destroy or damage the machine at a given capacity level is carried away by the coolant.

This increase in capacity is particularly advantageous in aircraft generators. In such a use, the weight of the generator is a substantial concern. Thus, for a desired capacity necessary to meet electrical consumption requirements on an aircraft, the weight of the generator may be minimized by increasing the effectiveness of its cooling system.

Typical generators employed in aircraft are so-called "brushless" generators. They frequently include a stator which includes a main armature, an exciter field, and a permanent magnet generator armature. The rotor includes a permanent magnet field, an exciter armature and a main field winding. In addition, the rotor will include a full or a half wave rectifier, usually a full wave rectifier, which interconnects the exciter armature and the main field winding to allow the former to energize the latter while at the same time rectifying the alternating current generated in the exciter armature to direct current before it is applied to the main field winding.

To adequately cool the rotor, it is necessary that both the exciter armature and the main field winding be cooled. It is also necessary to cool the rectifier.

While the rectifier is always electrically interposed between the exciter armature and the main field winding, it frequently will be physically interposed as well. Physical interposition of the rectifier frequently poses difficulty in providing for the flow of a coolant along the full length of the rotor shaft carrying the exciter armature and the main field winding while achieving a minimal pressure drop in the rotor coolant flow path from the inlet to the outlet, which minimal pressure drop maximizes machine efficiency.

The present invention is directed to overcoming one or more of the above problems.

SUMMARY OF THE INVENTION

It is the principal object of the invention to provide a new and improved generator. More specifically, it is an object of the invention to provide improved cooling in a generator rotor.

An exemplary embodiment of the invention achieves the foregoing object in a generator including a stator having a main armature. A rotor is journalled for rotation within the stator and the rotor includes a main field winding, an exciter armature, a rectifier interconnecting the field winding and the exciter armature, and a housing containing the rectifier. Cooling means are provided for the rotor and include a coolant inlet to the rotor as well as a coolant outlet from the rotor. First and second coolant ports are disposed in the housing with one of the ports being in fluid communication with one of the inlet and the outlet. An elongated conduit having opposed ends within the rotor is disposed in heat transfer relation with the field winding. One of the conduit ends is in fluid communication with the other of the ports and the other of the conduit ends is in fluid communication with the other of the inlet and the outlet.

In a preferred embodiment of the invention, a serial flow path for the coolant is established, first through the rectifier housing and secondly through the conduit, with the full flow of coolant being passed through the rectifier housing.

A highly preferred embodiment of the invention contemplates the shaft be hollow with the rectifier and housing therefor disposed within the hollow shaft. An annulus between the periphery of the rectifier housing and the interior of the shaft is provided as part of the coolant flow path and a coolant exit port from the housing is in fluid communication with such annulus which, in turn is closely adjacent the exciter armature and is in fluid communication with the conduit.

A highly preferred embodiment of the invention also contemplates the provision of a distributor which receives coolant from the housing coolant exit port and directs the same to one end of the conduit as well as receives coolant from the other end of the conduit and directs the same to the coolant outlet for the rotor.

In a preferred embodiment of the invention, the coolant conduit is U-shaped in configuration and preferably, there are a plurality of such conduits which are formed separately from the body of magnetizable material forming part of the rotor.

Other objects and advantages will become apparent from the following specification taken in connection with the accompanying drawings.

DESCRIPTION OF THE DRAWINGS

FIG. 3 is an enlarged, fragmentary sectional view taken approximately along the line 3—3 in FIG. 1; and FIG. 4 is a sectional view of a distributor employed in the generator taken approximately along the line 4—4 in FIG. 1.

DESCRIPTION OF THE PREFERRED EMBODIMENT

Figure 1:
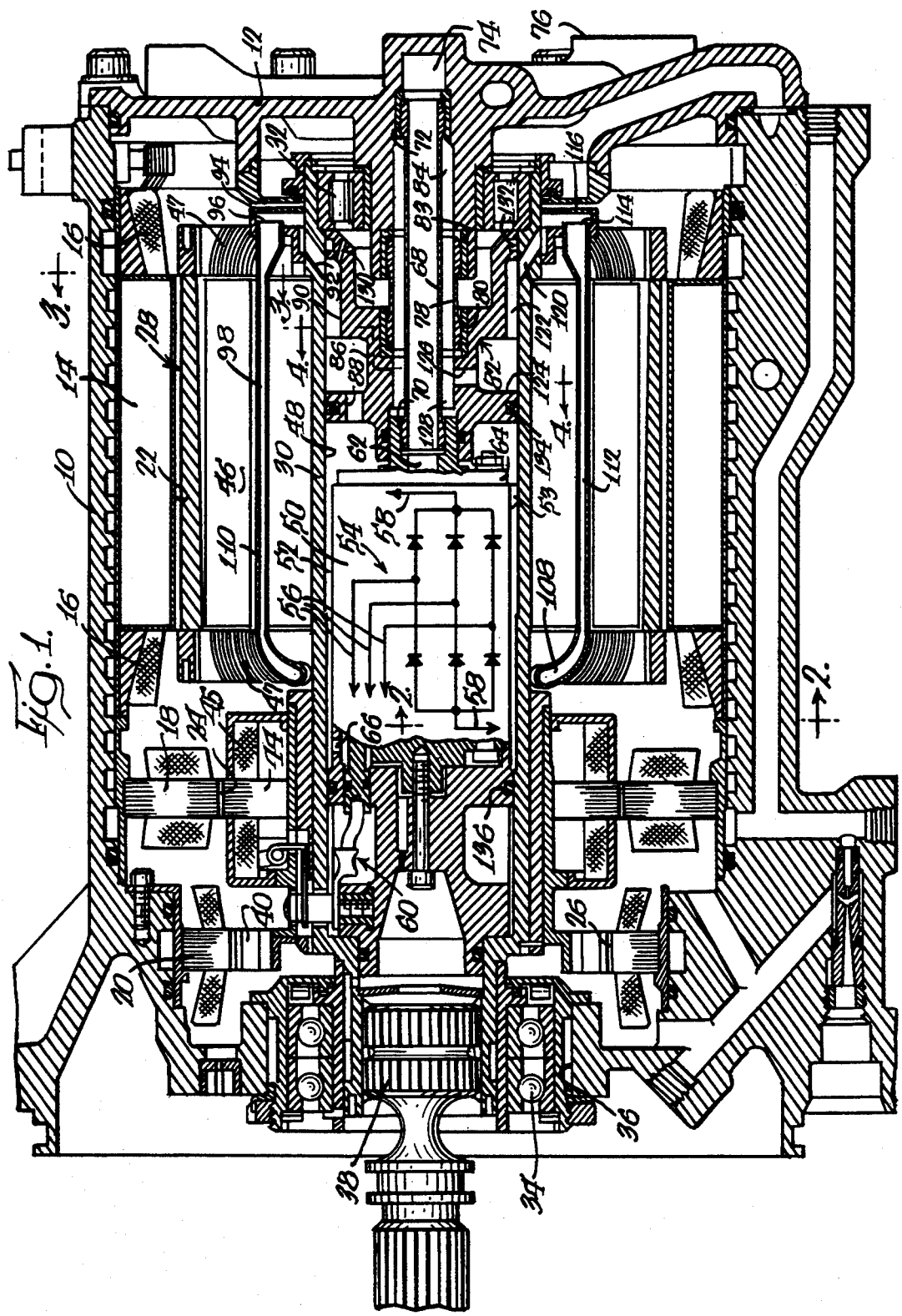
FIG. 1 is a sectional view of a generator made according to the invention.

An exemplary embodiment of a generator made according to the invention is illustrated in the drawings and with reference to FIG. 1 is seen to include a generally cup-shaped housing 10 closed at one end by a cap 12. Within the housing 10 is a stator including a main armature 14 provided with electrical windings 16. The stator also includes an exciter field 18 and the armature of a permanent magnet generator or pilot armature 20.

The main armature 14 includes a central opening 22 while the exciter field includes a coaxial opening 24. The armature 20 for the permanent magnet generator includes a coaxial opening 26.

Within the openings 22, 24 and 26 is a rotor, generally designated 28. The rotor 28 includes a hollow shaft 30 journalled at one end by bearings 32 mounted on the cap 12 and, at its opposite end, by bearings 34 mounted within an opening 36 in the housing 10. A splined coupling 38 is adapted to be connected to a source of rotary power such as an engine gearbox for rotating the rotor 28 within the openings 22, 24 and 26.

About its periphery, the shaft 30 mounts a series of permanent magnets 40 aligned with the opening 26 for inducing current in the armature 20. An exciter armature 44 is located on the shaft 30 within the opening 24 and includes windings 45 in which an alternating current, usually three phase, is induced as a result of conventional energization of the exciter field 18 by current induced in the armature 20 of the permanent magnet generator after suitable rectification.

The rotor 28 includes a body of magnetizable material 46 located within the opening 22 which may be conventionally arranged into a plurality of poles to receive windings 47, the end turns of which are seen in FIG. 1.

The interior of the hollow shaft 30 includes a wall designated 48 and within the same is a rectifier housing 50. The rectifier housing 50 is spaced from the interior wall 48 to define an annulus 52, such spacing accomplished by any suitable means as, for example, spacing legs 53 (only one of which is shown).

Contained within the rectifier housing 50 is a conventional rectifier shown schematically at 54. While the illustrated rectifier 54 is a full wave rectifier, in some instances, a half wave rectifier could be utilized.

In any event, the rectifier 54 includes phase leads 56 which are connected appropriately to the exciter armature winding 45 and field leads 58 which are appropriately connected to the main field winding 47 of the rotor 28. The actual physical construction of the rectifier 54 may be conventional as is its connection to the windings 45 and 47. For example, one of the connections of the phase leads 56 to the winding 47 is shown generally at 60.

The housing 50 includes an oil or coolant inlet port 62 formed in a cap 64 on the right axial end of the housing 50 as viewed in FIG. 1. The port 62 is on the rotational axis of the rotor 28.

At the opposite axial end of the housing 50, the same includes one or more, radially directed oil or coolant exit ports 66 which open to the annular space 52 in close adjacency to the exciter armature winding 45.

A first transfer tube 68 has a spherical journal 70 disposed in the port 62. At the end of the transfer tube 68 opposite the journal 70, a similar spherical journal 72 is disposed in the cap 12 such that the interior of the transfer tube 68 is in fluid communication with a coolant inlet 74. The coolant inlet 74 is connected by a conduit (not shown) formed within the cap 12 which extends to a boss 76 which in turn may be connected to a source of coolant under pressure. In the usual case, the coolant will be an oil so that the same may additionally be employed for lubrication purposes.

A second transfer tube 78 surrounds the tube 68 and includes a spherical journal 80 on one end received in a distributor, generally designated 82, for purposes to be seen. The opposite end 83 of the transfer tube 78 also is provided with a spherical journal and is received within the cap 12. An annular space 84 about the tube 68 is formed within the cap 12 and, by means of a suitable passage (not shown) connected to drain, serves as a coolant outlet for the rotor. In this connection, both the transfer tubes 68 and 78 operate as is known to interconnect and seal between stationary portions of the apparatus, namely the cap 12, and rotary portions of the apparatus, namely, the housing 50 and the distributor 82 which rotate with the rotor 28.

Referring now to FIGS. 1 and 4, the distributor 82 will be described in greater detail. A plurality of equally angularly spaced, radially outwardly opening recesses 86 are formed in the periphery of the distributor 82 and by means of axial bores 88 are placed in fluid communication with the interior of the hollow shaft 30 adjacent the housing 50 and thus are in fluid communication with the annulus 52 about the housing 50. Consequently, coolant exiting from the ports 66 of the housing 50 may flow to each of the recesses 86.

Connected to each recess 86 is an axial groove 90 which extends rightwardly as seen in FIG. 1 to a corresponding diagonal bore 92 (only one of which is shown) in the end of the shaft 30 adjacent the bearings 32. Thus, the coolant may exit the interior of the shaft via the bore 92 to be received in a manifold 94. The manifold 94 is in fluid communication with one end 96 of a plurality of elongated conduits 98 which are in heat transfer relation with the windings 47 of the main field of the rotor 28. As best seen in FIG. 3, each conduit 98 has a cross section of a generally flattened triangle and the sides 100 and 102 embrace the bottom of the windings 47 for two adjacent poles 104 and 106 of magnetic material while the base 107 is in heat transfer contact with the magnetizable material forming the rotor body 46.

Figure 2:
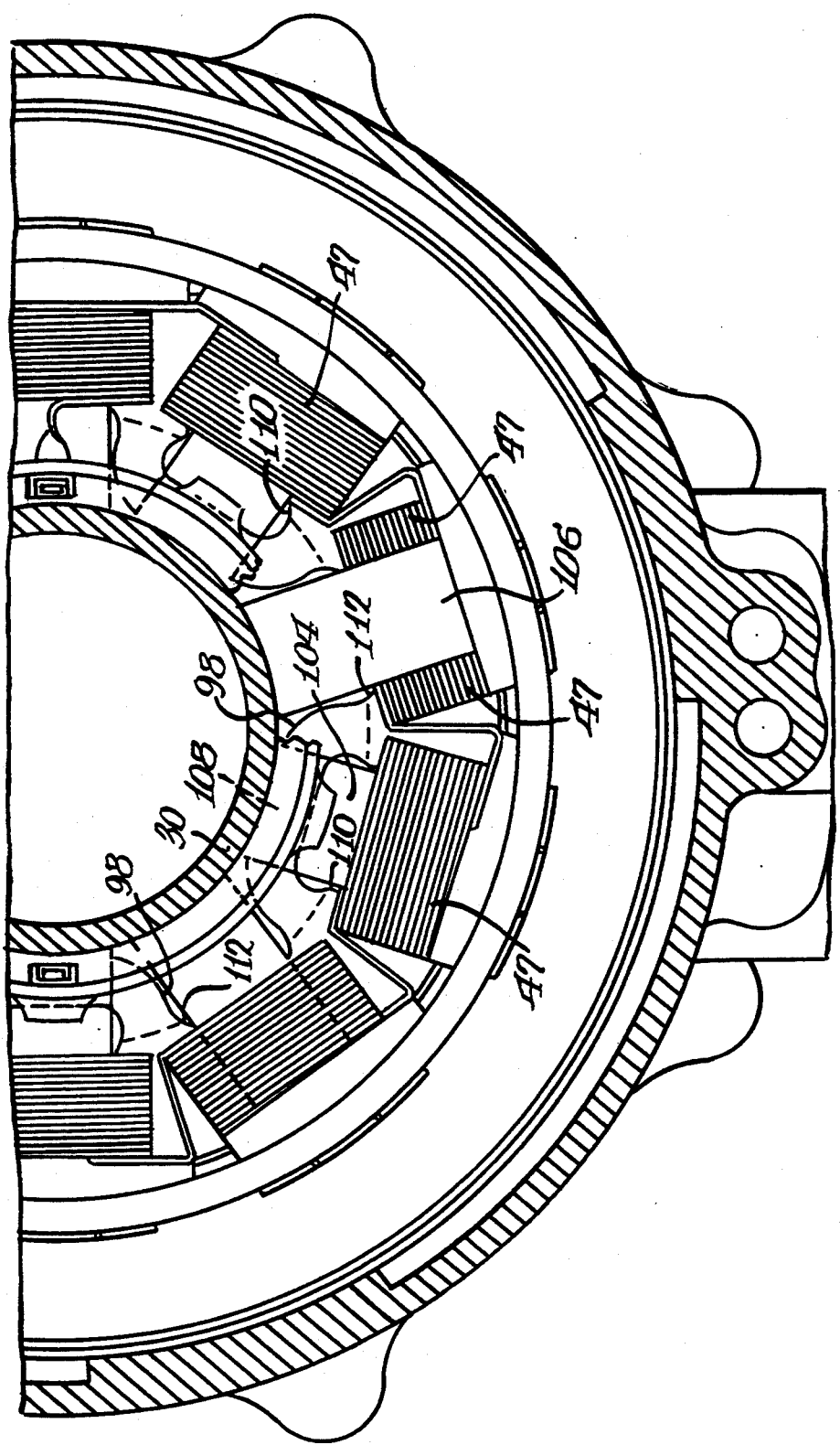
FIG. 2 is a fragmentary sectional view of the generator taken approximately along the line 2—2 in FIG. 1.

As seen in FIG. 2, the conduits 98 are generally U-shaped and as seen in FIG. 1, have their bights 108 extending from the body of magnetizable material 46 at its end opposite the manifold 94. One leg 110 (FIG. 1) having the end 96 of each conduit 98 is in fluid communication with the manifold 94 while the opposite leg 112 terminates in an end 114 in fluid communication with a manifold 116.

Thus, fluid exiting the housing 50 will ultimately flow via the manifold 94 into the ends 96 of the conduits 98 and through the legs 110 thereof to the bights 108. The bights 108 in turn will cause the fluid to be directed to the legs 112 to emerge from the ends 114 of the conduits 98 in the manifold 116.

To provide for such a flow pattern, it will be readily appreciated that the conduits 98 are formed separately from the body of magnetizable material 46 of the rotor. It will also be appreciated that the number of conduits 98 will be equal to half the number of poles on the rotor.

Fluid received in the manifold 116 is transferred via a series of diagonal bores 120 to axial grooves 122 (FIGS. 1 and 4) in the distributor 82. The grooves 122 are equally angularly spaced from each other and interleaved with the grooves 90 about the periphery of the distributor 82 and extend to equally angularly spaced recesses 124 in the distributor 82 which likewise are interspersed between the recesses 86.

Radial bores 126 extend to an annular space 128 at the exterior of the transfer tube 68 and in fluid communication with the interior of the transfer tube 78. Thus, the coolant received in the manifold 116 flows via diagonal bores 120 and axial grooves 122 to the recesses 124. From there, the coolant flows via the radial bores 126, the annular space 128 and the interior of the transfer tube 78 to the coolant outlet defined by the annular space 84.

For lubrication purposes, the distributor 82 may include a small bore 130 extending from one or more of the axial grooves 90 toward the bearings 32.

To prevent leakage, the distributor is provided with a peripheral seal 132 sealing against the interior wall 48 of the shaft 30 adjacent the bearings 32. A similar seal 134 isolates the recesses 86 and 124 from each other. Leakage in the vicinity of the exciter is prevented by a seal 136 and other seals are employed for like purposes in the locations illustrated in FIG. 1.

From the foregoing description, it will be appreciated that a serial flow pattern for the coolant is defined with the coolant first cooling the rectifier 54 and then the windings 47. In the latter respect, the various conduits 98 are connected in parallel with each other but are of course, in series with the rectifier 54 along the flow path.

The construction provides for coolant flow through the interior of the housing 50 in intimate contact with the rectifier 54 to cool the same. The emergence of the coolant at the port or ports 66 in the immediate vicinity of the exciter armature 44 into the annulus 52 allows the coolant to absorb heat conducted to the shaft 30 from both the exciter armature 44 and the main field of the rotor. As the coolant flows from left to right as viewed in FIG. 1 through the annulus, additional heat conducted from the exterior wall of the rectifier housing 50 is absorbed.

The coolant ultimately enters the conduits and absorbs more heat from the laminations that typically would be used in forming the body 46 of magnetizable material as well as from the windings 47 and then is returned to the interior of the shaft 30 to ultimately exit into the housing 10.

The arrangement provides for flowing the full amount of coolant flow through the rectifier 54 to cool the same as well as for heat absorption from the rotor shaft along substantially its entire length and assures priority of oil flow to the rectifier to make sure that gets cooled and then the subsequent parallel flow in the iron provides for efficient cooling in that location.

The nature of the construction is such as to provide a minimum restriction on oil or coolant flow with the result that the pressure drop to the system is minimal to maximize machine efficiency.

What is claimed is:

1. A generator comprising:
   a stator including a main armature;
   a rotor journalled for rotation within said stator, said rotor including
   (a) a main field winding,
   (b) an exciter armature,
   (c) a rectifier interconnecting said field winding and said exciter armature, and
   (d) a housing containing said rectifier; and cooling means for said rotor including
   (a) a coolant inlet connected to the interior of said housing,
   (b) an outlet port from said housing,
   (c) at least one elongated conduit in heat transfer relation with said field winding having opposed ends,
   (d) a coolant outlet from said rotor, and
   (e) a distributor within said rotor for
      (i) directing coolant from said outlet port to one end of said conduit and
      (ii) receiving coolant from the other end of said conduit and directing the coolant to said coolant outlet.

2. The generator of claim 1 wherein said conduit its U-shaped.

3. The generator of claim 2 wherein at least one of said coolant inlet and said coolant outlet comprise a transfer tube.

4. The generator of claim 3 wherein said rotor includes a hollow shaft and said rectifier, said housing, said coolant inlet and said distributor are located within said shaft with said distributor being axially spaced from said housing.

5. The generator of claim 4 wherein said outlet port is remote from said distributor and said housing is at least in part spaced from the interior of said shaft such that said shaft confines the coolant as it flows from said outlet port to said distributor.

6. A generator comprising:
   a stator including a main armature;
   a rotor journalled for rotation within said stator, said rotor including
   (a) a main field winding,
   (b) an exciter armature,
   (c) a rectifier interconnecting said field winding and said exciter armature, and
   (d) a housing containing said rectifier; and cooling means for said rotor including
   (a) a coolant inlet connected directly to the interior of said housing,
   (b) an outlet port from said housing,
   (c) at least one elongated conduit in heat transfer relation with said field winding having opposed ends; and
   first of said conduit ends being in fluid communication with said outlet port and second ones of said conduit ends being in fluid communication with said coolant outlet;
   whereby a serial coolant flow path extending first to said rectifier and secondly to said conduit is established for substantially the full flow of coolant through said rectifier housing.

7. The generator of claim 6 wherein there are a plurality of said conduits, each in heat transfer relation with said field windings, said conduits being in parallel with each other.

8. The generator of claim 7 wherein said rotor includes a body of magnetic material and said conduits are formed separately from said body and are generally U-shaped.

9. A generator comprising:
   a stator including a main armature;
   a rotor journalled for rotation within said stator, said rotor including
   (a) a main field winding,
   (b) an exciter armature,
   (c) a rectifier interconnecting said field winding and said exciter armature, and
   (d) a housing containing said rectifier; and cooling means for said rotor including
   (a) a coolant inlet to said rotor,
   (b) a coolant outlet from said rotor,
   (c) first and second spaced coolant ports in said housing, one of said ports being in fluid communication with one of said inlet and said outlet and
   (d) an elongated conduit having opposed ends located within said rotor and in heat transfer relation with said field winding, one of said ends being in fluid communication with the other of said ports and the other of said ends being in fluid communication with the other of said inlet and said outlet.

* * * * *